Figure 1:
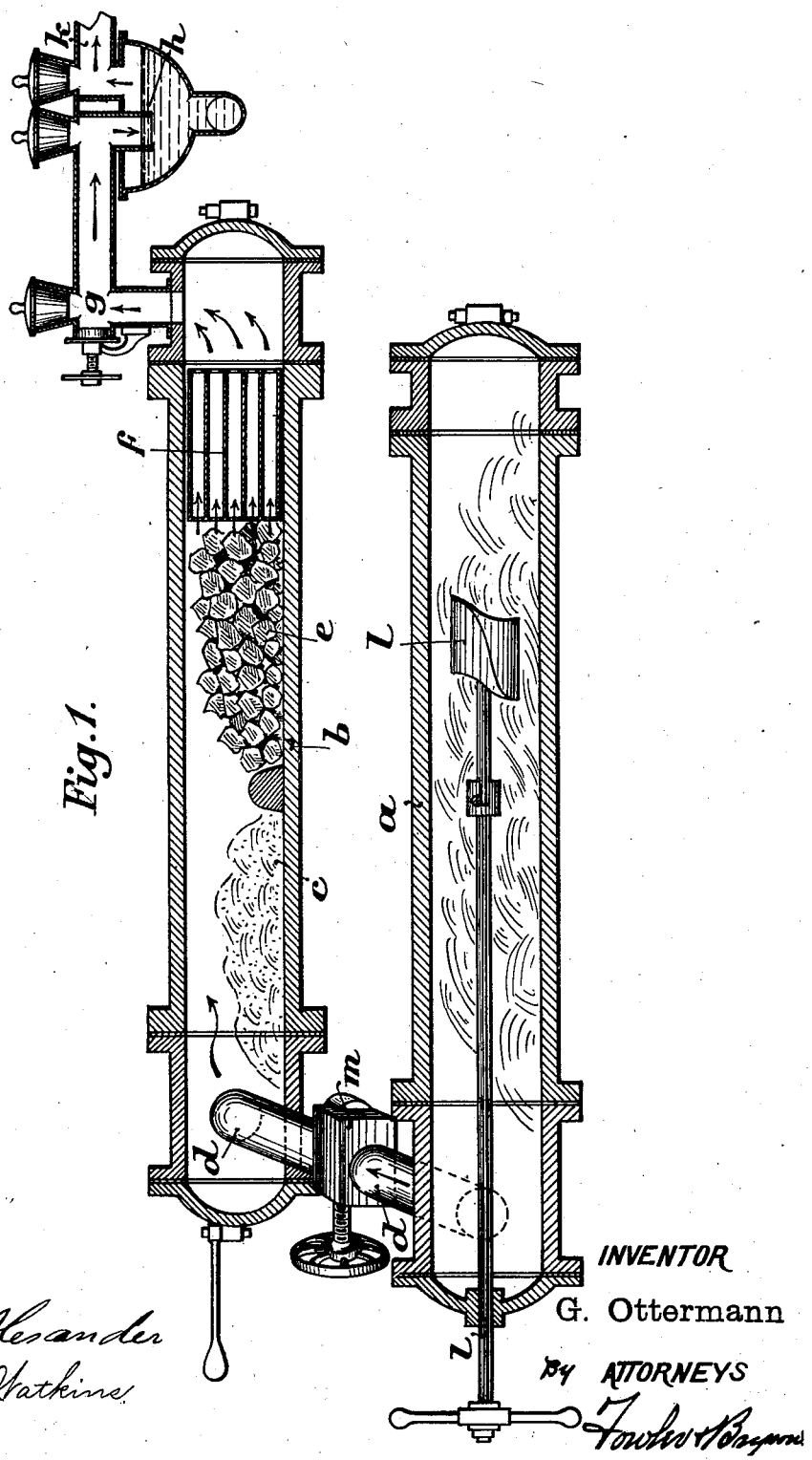

No. 701,604. Patented June 3, 1902.
G. OTTERMANN.
PROCESS OF MAKING CYANIDS.
(Application filed Feb. 15, 1901.)
(No Model.) 2 Sheets—Sheet 1.

WITNESSES
INVENTOR
G. Ottermann
BY ATTORNEYS

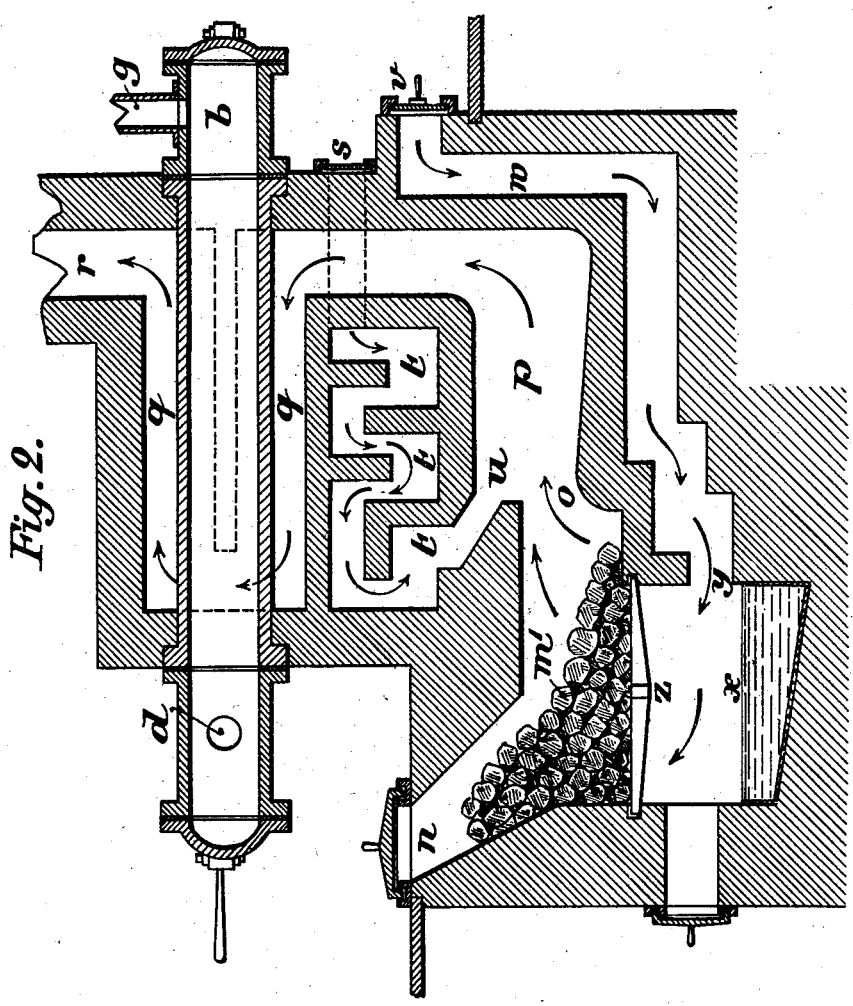

UNITED STATES PATENT OFFICE.

GEORGE OTTERMANN, OF VIENNA, AUSTRIA-HUNGARY.

PROCESS OF MAKING CYANIDS.

SPECIFICATION forming part of Letters Patent No. 701,604, dated June 3, 1902.

Application filed February 15, 1901. Serial No. 47,425. (No specimens.)

*To all whom it may concern:*

Be it known that I, GEORGE OTTERMANN, merchant, a subject of the Emperor of Austria-Hungary, residing at Schottenbastei 4, Vienna, Austria-Hungary, have invented a certain new and useful Improvement in Manufacture of Cyanogen Compounds from Household Waste Products and Similar Organic Substances; and I do hereby declare the following to be a full, clear, and exact description of the invention, such as will enable others skilled in the art to which it appertains to make and use the same.

The present invention relates to the manufacture of cyanogen compounds from waste household products and similar substances, consisting of organic compounds containing carbon, hydrogen, oxygen, and nitrogen, and occasionally of inorganic carbonates.

My process consists in subjecting the said substances to destructive distillation, leading the gases thus produced first over heated neutral material, such as incandescent paper-ashes, then over heated carbonaceous material, and finally over a heated mixture capable of absorbing nitrogen, and thus forming cyanogen compounds. By leading the gas and vapors distilled from waste household products over heated neutral substances and heated carbonaceous substances a conversion of the gas takes place which transforms the gases which are detrimental to the production of cyanids into gases which do not have any injurious effect on the formation of cyanids. As materials suitable for absorbing nitrogen I have found practicable a mixture of carbonates of the alkalies with coal, a mixture of coal and iron, &c. An expert will choose the substances suitable for absorbing the nitrogen present in the gas from the destructive distillation according to the cyanogen compounds which he wishes to manufacture.

I have already described a process for producing gas from waste household products by leading the gas from the destructive distillation over heated neutral material and heated carbonaceous material in my application, Serial No. 740,291, filed December 14, 1899.

Of the accompanying drawings, which illustrate one form of apparatus suitable for carrying on my process, Figure 1 is a perspective view showing the retort in section, and Fig. 2 is a vertical longitudinal section of a furnace for heating the retorts.

In Fig. 1, $a$ is a fire-clay retort, in which the distillation of the refuse is effected. $b$ is the second fire-clay retort, into which the gases produced in $a$ are led by the connecting-pipe $d$. The retort $b$ contains in the space $c$ paper-ashes or other chemically-neutral material, while the space $c$ contains coke.

In the space $f$ of the retort $b$ is arranged an iron receptacle, which is divided into compartments and is intended to receive the substances to be combined with the nitrogen, and thus to form the cyanogen compounds. Both retorts are placed in a generator-furnace.

The gas generated in the retort $a$ passes through the connecting-pipe $d$ into the transforming-retort $b$, where it first passes through the mass of paper-ashes $c$ and then over the coke $e$ and finally through the receptacle $f$, whence it passes off through the discharge-pipe $g$ and the hydraulic main $h$ into the pipe $k$, leading to the condenser and scrubber. For facilitating formation of the gas and for effecting a rapid distillation I provide, preferably, a stirring apparatus $l$, projecting into the retort $a$.

The charging of the retort $a$ is effected through the opposite end of the retort, which is provided with a hinged door for this purpose. The charging of the paper and coke into the retort $b$ is effected at suitable intervals from either end. When recharging with coke, which is effected after about twenty-four hours, the vessel $f$, serving for the production of the cyanogen, is removed and emptied, the contents being further treated in the known manner, and a new vessel $f$, charged with fresh material, is introduced into the retort $b$. In order to avoid as much as possible any access of air, which would be injurious to the cyanogen compounds, a slide $m$ in the connecting-pipe $d$ is closed at those times when the retort $a$ is being opened and closed.

The above-described apparatus can also be modified by combining two or more distilling-retorts with one converter-retort. Also one or more distilling-retorts can be combined with several converter-retorts, of which one only contains paper-ashes, the next only carbon, and the third only the materials for producing cyanogen compounds, the gas produced being caused to pass consecutively through each of these retorts. Inclined retorts communicating with each other can also be used. The cyanogen-producing apparatus might also be arranged between the coke and the paper-ashes, but with a much inferior effect. The furnace has an opening $n$ for the introduction of the fuel. The latter is conducted by the sliding shaft $m'$ to the grate $z$, where it is burned. The gases from the combustion pass over the fire-bridge $o$ to the combustion-chamber $p$, where they are completely burned by the air introduced at $n$. The gases are led by channels $q$ to the retort and pass along the retort parallel to the longitudinal direction to the flue $r$ and from this to the chimney. The primary air is introduced at $v$, passes the channels $w$, whereby it is heated, and is conducted over the water-tank $x$ and comes at $z$ below the grate-bars to the fuel. The secondary air enters at $s$ and passes through the channels $t$ to the chamber $u$, from which it enters the combustion-chamber $p$.

In carrying out my process I charge the retort $a$ with the waste products and raise it to a temperature of from 700° to 800° centigrade. The resulting gases and vapors then pass through the pipe $d$ and come into contact with the incandescent paper-ashes $c$ in the retort $b$. This brings the gases to the temperature of dissociation. The gases now pass over the heated coke $e$, where they are converted into heating and illuminating gases containing more or less nitrogen or nitrogen compounds. The nitrogen contained in the gas is absorbed by the materials in the vessels $f$.

Having now fully described my invention, what I claim as new, and desire to secure by Letters Patent of the United States, is—

1. The process of producing cyanogen compounds from waste household substances and similar organic substances containing nitrogen, which consists in first subjecting said substances to destructive distillation, then bringing the resulting gases into contact with heated neutral material, then bringing said gases into contact with heated carbonaceous material, and finally bringing said gases into contact with heated nitrogen-absorbing material.

2. The process of producing cyanogen compounds from waste household substances and similar organic substances containing nitrogen, which consists in first subjecting said substances to destructive distillation, then bringing the resulting gases into contact with heated neutral material, then bringing said gases into contact with heated carbonaceous material, and finally bringing said gases into contact with a heated mixture of coal and carbonates of the alkalies.

In witness whereof I have hereunto set my hand in presence of two witnesses.

GEORGE OTTERMANN.

Witnesses:
C. B. HUNT,
ALVESTO P. HOGUE.